Figure 1:
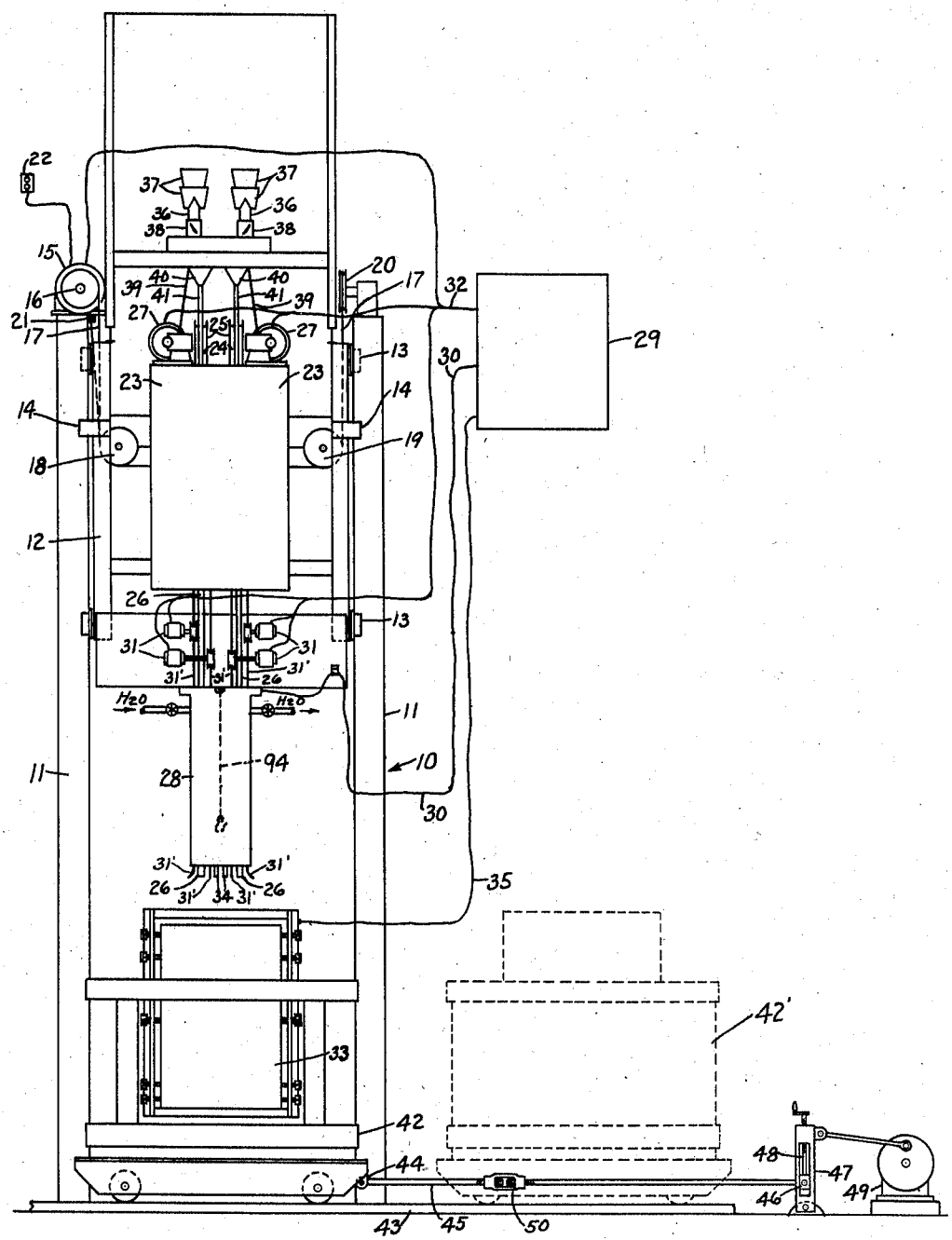

April 14, 1942.   R. K. HOPKINS   2,279,990
METAL PRODUCING APPARATUS
Filed Dec. 26, 1940   5 Sheets-Sheet 3

ROBERT K. HOPKINS.
INVENTOR

BY *Virgil F. Davies*
ATTORNEY

April 14, 1942.    R. K. HOPKINS    2,279,990
METAL PRODUCING APPARATUS
Filed Dec. 26, 1940    5 Sheets-Sheet 4

ROBERT K. HOPKINS
INVENTOR

BY Virgil F. Davis
ATTORNEY

ROBERT K. HOPKINS.
INVENTOR

Patented Apr. 14, 1942

2,279,990

UNITED STATES PATENT OFFICE 2,279,990

METAL PRODUCING APPARATUS

Robert K. Hopkins, New York, N. Y., assignor to The M. W. Kellogg Company, New York, N. Y., a corporation of Delaware Application December 26, 1940, Serial No. 371,630

26 Claims. (Cl. 22—58)

This invention relates to the production of metals and more particularly to novel apparatus for producing metal under the influence of a flux submerged electric current discharge.

I have heretofore disclosed the production of metal by the use of a flux submerged electric current discharge in the manufacture of composite metal bodies. In my prior Patent No. 2,191,481 apparatus is disclosed which has been found satisfactory for this purpose.

In large scale commercial operations several problems are presented on the proper solution of which depends in a substantial measure the efficiency and commercial success of the operations. Thus, the metal producing apparatus must be kept in productive use with a minimum of idle time if efficient use is to be made of the apparatus and the cost of the product is to be kept low. For this result the mold arrangement used must be such that it can be quickly and accurately assembled and quickly and accurately positioned relative to the metal producing apparatus. The mold arrangement should also be such that when one operation is completed the mold used can be quickly removed and the mold for the next operation substituted with a minimum loss of operating time.

The apparatus of this invention solves the problems mentioned above, as well as other important problems, in an efficient and satisfactory manner.

It is one of the main objects of this invention to provide apparatus for the production of composite metal bodies, by the use of the flux submerged electric current discharge, which includes an arrangement for quickly and accurately positioning the base metal workpiece, and the mold into which the coating metal is deposited, relative to the metal producing elements of the apparatus; the arrangement being such that at the completion of one operation the resulting composite metal can be quickly removed and another base metal workpiece quickly positioned relative to the metal producing elements of the apparatus with a minimum loss of time.

It is also one of the main objects of the invention to provide apparatus for the production of composite metal bodies, by the use of the flux submerged electric current discharge, which includes a base metal workpiece positioning and mold forming assembly so constructed and arranged that base metal workpieces of various sizes may be quickly and accurately positioned and a metal tight mold, with one of its sides defined by the base metal workpiece, of the required size quickly formed; the assembly being such that at the end of an operation the coated base metal workpiece can be quickly removed and another base metal workpiece substituted.

It is a further important object of the invention to provide apparatus for the production of composite metal bodies, by the use of the flux submerged electric current discharge, in which the base metal workpiece and the mold into which the deposited metal is deposited are oscillated relative to the metal producing elements of the apparatus; the arrangement being such that the base metal workpiece may be accurately and quickly positioned, the mold quickly formed and the amplitude and period of oscillation adjusted.

It is also a primary object of the invention to provide apparatus for the production of composite metal bodies, by the use of the flux submerged electric current discharge, which includes a base metal workpiece positioning and mold forming arrangement of such character that the base metal workpiece can be quickly and accurately placed in an element of the arrangement with said element removed from the remainder of the elements of the arrangement and said element, after the workpiece has been placed therein, can be readily positioned in the arrangement and the desired mold formed; the arrangement being such furthermore that at the end of the operation said element with the coated workpiece therein can be readily removed from the arrangement.

It is a further object of this invention to provide apparatus for the manufacture of composite metal bodies, by the use of the flux submerged electric current discharge, which includes a mold formed by the base metal workpiece and metal mold forming elements, certain of the mold forming elements being adjustably positionable whereby proper molds may be formed with base metal workpieces of various sizes, the metal mold forming elements being such that their surfaces may be exposed directly to the metal deposited in the mold or one, or more, of the surfaces may be covered with an easily erectable sectional wall made of ceramic material, or other material of low heat conductivity; the metal mold forming elements furthermore being provided with cooling arrangements so that the rate of heat transfer through them may be controlled.

Figure 2:
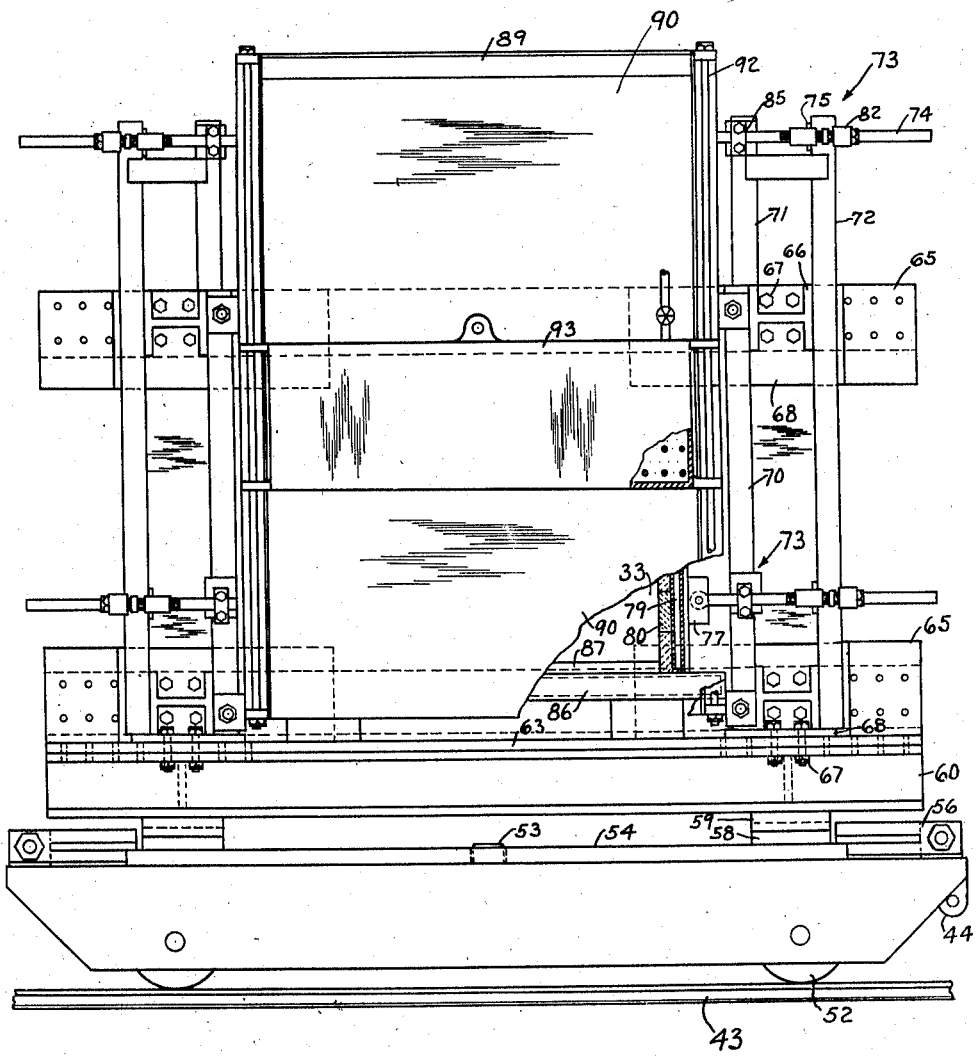
Figure 3:
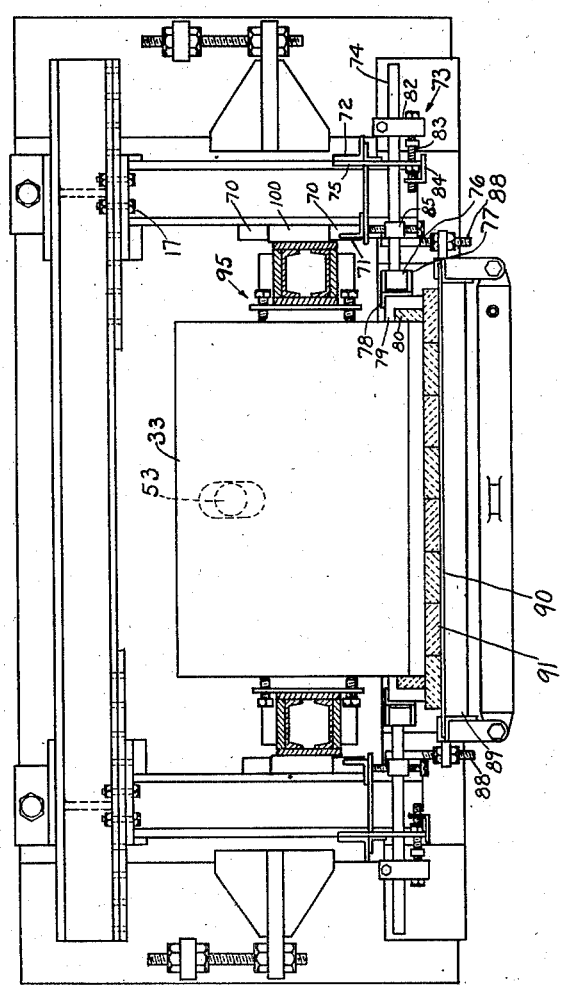
Figure 4:
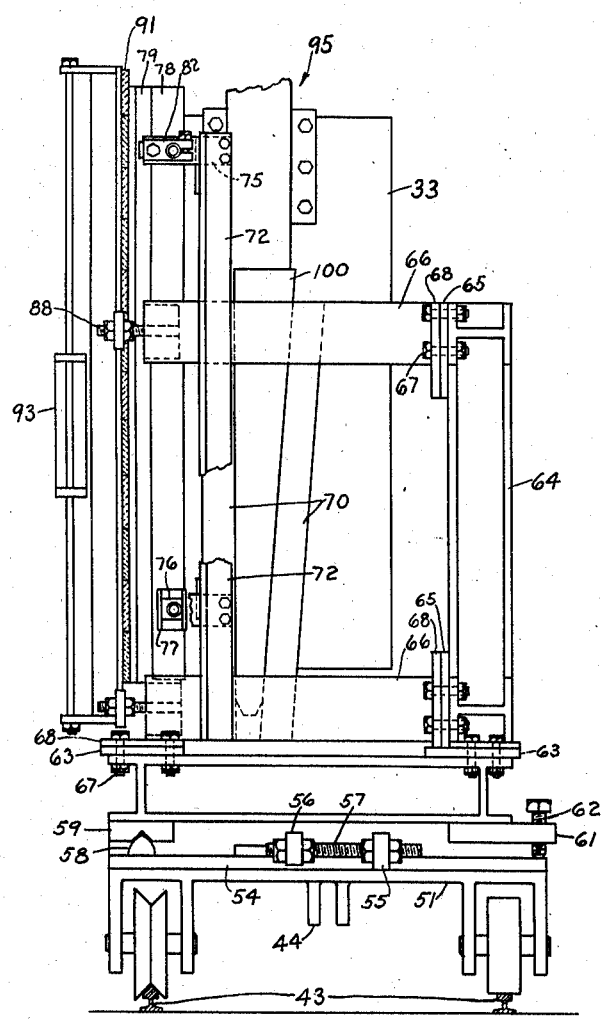
Figure 6:
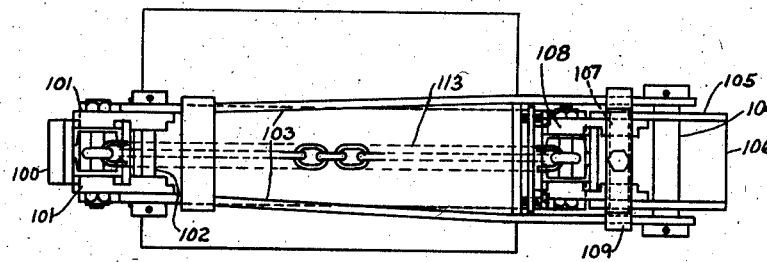
Figure 5:
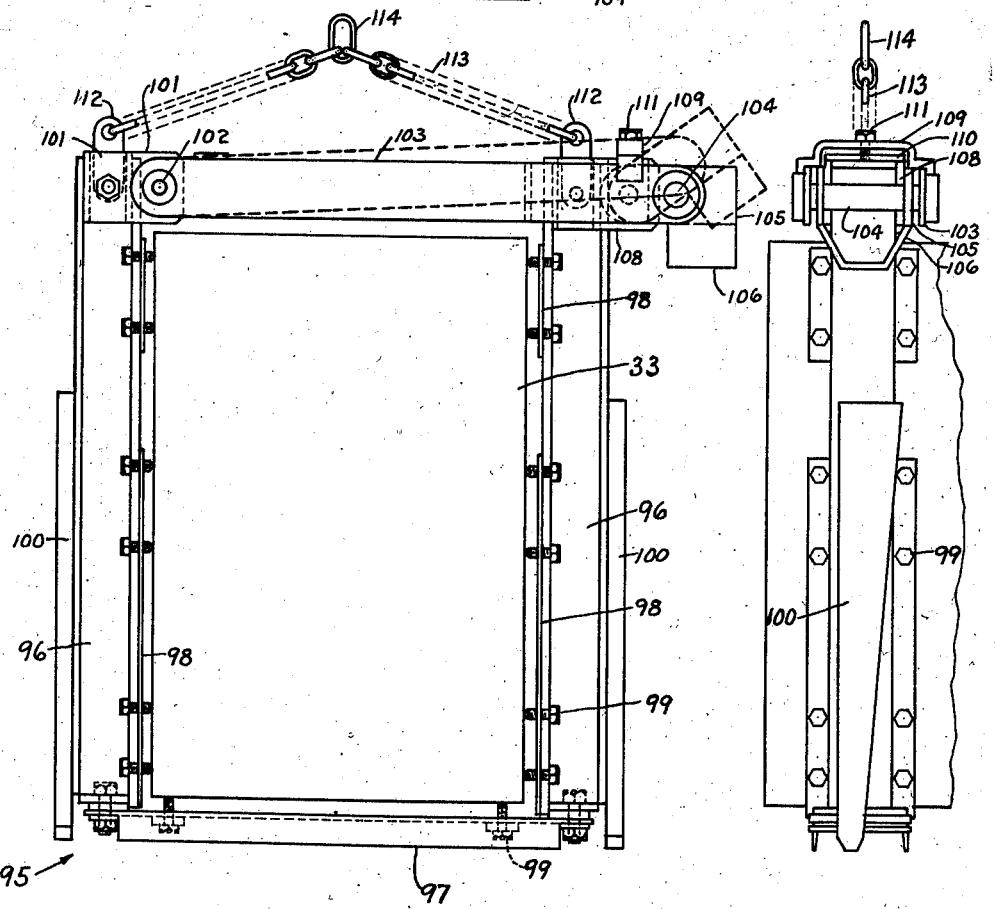
Figure 7:
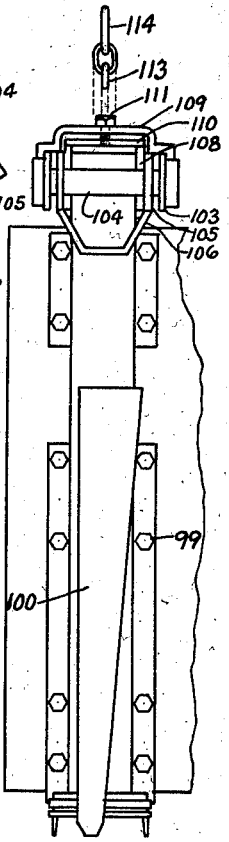

The further objects and advantages of the invention will be readily understood from a consideration of the following description of a present preferred embodiment of the invention taken with the accompanying drawings, in which, Fig. 1 is a front view of the apparatus of the invention, Figs. 2, 3 and 4 are respectively front, top and end views of the mold truck, and Figs. 5, 6 and 7 are respectively front, top and end views of the base metal retaining yoke.

The novel apparatus of the invention is especially suited for use in the large scale commercial production of coated articles of a wide range of compositions. The base metal of the articles produced may be carbon steel, low alloy steel, or any of the ferrous or non-ferrous metals and alloys commonly used in the manufacture of machines, apparatus, vessels, containers, structural members, etc. The coating metal may be any ferrous or non ferrous metal or alloy such as chrome steel, manganese steel, chrome-nickel steel, Monel metal, etc., having corrosion, or oxidation, or wear, or other resisting property superior to that of the chosen base metal in the intended service.

The method used in the production of coated articles with the novel apparatus of this invention is disclosed in my prior United States Patent No. 2,191,481, consequently it need not be set forth in detail here. The method employed is such that while the article produced is a composite, i. e., it is made up of base metal and coating metal, it is in fact a unitary article as the base metal and coating metal are inseparably bonded together throughout their common extent. The composite articles produced may be in the finished or substantially finished form or they may be in the form of intermediate articles or work-pieces such as ingots, slabs, etc.

Referring now to the drawings.

The apparatus assembly of Fig. 1 comprises a rectangular supporting frame 10 which includes four vertical members 11, the two in back of the plane of the paper not being shown. The front of frame 10 is open, as shown, to permit vertical movement of carriage 12. Carriage 12 carries two sets of rollers 13; rollers 13 of the bottom set bear against the front faces of members 11 while rollers 13 of the top set bear against the back faces of members 11. The weight distribution is such as to assure this result. As a precaution against accidental tilting of carriage 12 stops 14 are secured to carriage 12. These stops will come in contact with the front surface of members 11 if the top set of rollers 13 leaves the back surface of members 11.

A variable speed hoist motor arrangement 15, mounted at the top of frame 10, drives a cable drum 16. Cable 17 passes from drum 16 under sheaves 18 and 19 and over sheave 20. From sheave 20 cable 17 passes under two sheaves, not shown, in back of sheaves 19 and 18. From the last of these sheaves cable 17 passes upwardly; its end is fastened to frame 10 as at 21. Sheave 20 is mounted on member 11; the other sheaves are mounted on carriage 12. The operation of hoist motor arrangement 15 is automatically controlled as will be explained hereinafter, however, a hand switch 22 is also provided, within convenient reach of the operator, for manual control.

Carriage 12 carries mounted thereon a pair of tube forming mechanisms 23 which receive metal strip 24 from reels 25 and form hollow electrodes 26. Variable speed reversible motors 27 drive mechanisms 23 and are thus the feed motors for hollow electrodes 26. Hollow electrodes 26 pass from forming devices 23 through a water cooled contact device 28 wherein they are contacted with their respective current supplies. The current supplies may be individual generators, transformers, etc., for the purpose of this disclosure they will be considered as located in back of control panel 29. While the current is conducted to each electrode, electrodes 26 and the other electrodes to be later mentioned, by a separate cable, for the sake of simplicity a single master cable 30 is shown. Contact device 28 includes a separate contact nozzle for each electrode and each nozzle is electrically isolated from the other nozzles, also each nozzle is individually connected to its proper current supply cable.

Arc control arrangements, such as are used in the arc-welding end electric furnace arts, are provided in back of control panel 29 for each motor 27. These arrangements control the operation of the motors to maintain electric discharges of substantially constant characteristics from the ends of their respective electrodes 26. Motors 27, as well as the motor 15 and the wire feed motors 31 to be later mentioned, are connected to their respective control arrangements and current supply sources by appropriate leads, or cables; for simplicity a single cable 32, formed by grouping the leads, or cables, of the various motors is shown issuing from control panel 29 and branching to the various motors.

Four wire reels, a smaller or greater number may be employed, are supported on carriage 12, or if preferred, on a support at a point removed from carriage 12. Wire electrodes 31' pass from these reels and are fed by feed motors 31 through their respective contact nozzles in contact device 28. Arc control arrangements, positioned in back of control panel 29, control the operation of each motor 31 to maintain a discharge of substantially constant characteristics from the end of its respective wire electrode. Since one of the primary functions of the wire electrodes is to fuse surface metal of the metal work-piece 33 in the zone of the rising liquid coating metal, the contact nozzle of each wire electrode is shaped to direct the wire electrode at an angle towards the surface of workpiece 33. In addition, the contact nozzles of the outer wire electrodes are shaped to direct these electrodes laterally outward from the sides of contact device 28 so that these wire electrodes can reach the very edges of workpiece 33. This feature of the apparatus, as well as the features above considered are described at greater length in my Patent No. 2,191,481 and reference may be made to this patent for a better understanding of the details.

Between the inner wire electrodes are positioned non-consumable pilot electrodes 34. The pilot electrode arrangement and its manner of operation is disclosed in detail in my prior U. S. Patent application Serial No. 365,411 filed November 13, 1940. During operation one of the pilot electrodes discharges electric current through a gap between its end and the surface of the molten coating metal while the other pilot electrode is adapted, when the molten flux blanket is of a predetermined depth, to discharge electric current through a gap between its end and the surface of the molten flux. Electrodes 34 have separate electrical circuits. Arc control arrangements are provided in back of control panel 29 which preferably control the operation of hoist motor arrangement 15 to raise carriage 12 as required to maintain a discharge of constant characteristics from the end of the pilot electrode 34 that discharges to the surface of the molten metal. The other pilot electrode 34 is used to indicate the depth of the molten flux. With this control of the operation of hoist motor arrangement 15, a constant distance is maintained between the bottom of contact device 28 and the rising molten flux and molten metal in the mold space; also, a constant positional relation is maintained between the ends of wire electrodes 31' and the surface of workpiece 33 that they are designed to fuse.

The other side of the various electrode current supply circuits is connected to workpiece 33 through a cable 35 that issues from control panel 29.

On a platform above motors 27 is mounted a pair of sets of metering devices 36 which include hoppers 37 for holding granular materials that are made up of constituents of the required coating metals. Each of the sets of metering devices 36 are driven through a combined clutch and gear box 38 by a shaft 39 that in turn is driven by one of motors 27, suitable universal joints being included between motors 27 and gear boxes 38. Each set of metering devices is provided with a collection hopper 40 into which the materials after being metered pass. From hopper 40 the metered materials pass into tubes 41 which conduct them into hollow electrodes 26. By this arrangement a constant relation between the feed of the granular materials and the feed of the hollow electrodes is maintained.

Workpiece 33 is positioned in a mold forming arrangement carried by mold truck 42, both to be hereinafter described. Truck 42 is movable back and forth on rails 43 one of which has a beveled top to prevent lateral movement of the truck. The truck and mold arrangement are so positioned relative to carriage 12 that contact device 28 can be lowered into the mold space to carry out the deposition of the coating metal therein. At one end of truck 42 is provided a clevis like arrangement 44 the pin of which passes through an eye at one end of rod 45. The other end of rod 45 is pivoted on a block 46 vertically positionable in the slot of member 47. A screw 48 threaded through the end of member 47, is provided for adjusting the vertical position of block 46. The bottom end of member 47 is pivoted to a fixed element while the upper end carries pivoted thereto one end of a crank arrangement that is driven by motor 49 that includes a speed reducer. Rod 45 is parted and oppositely threaded to accommodate turn-buckle 50. Preparatory to the coating operation, and after workpiece 33 has been positioned and the mold formed, as explained hereinafter, truck 42 is moved into position below contact device 28 until the middle of the contact device is approximately over the middle of the mold space. Hoist motor arrangement 15 is then set in operation, by manipulating switch 22, to lower contact device 28 into the mold until it closely approaches the metal bottom of the mold space. The hook at the end of member 94 can then be slipped in the eye of box 93. By rotating turn-buckle 50 in the proper direction truck 42 is moved to bring the middle of the mold space and the middle of contact device 28 in exact alignment. Motor 49 is then set in motion and screw 48 rotated as required to adjust the length of the travel of truck 42 so that each end wire electrodes 31' just reaches the extreme edge of the workpiece on its side of the mold at the end of the travel of truck 42 in its direction. Suitable arc starters having been provided, as by placing a depth of steel wool in the bottom of the mold space and by wrapping steel wool around the ends of the electrodes, the various energy circuits may be closed and the coating operation begun. During the coating operation another workpiece may be placed in position and a mold formed on the truck 42' shown in dotted lines to the side of truck 42.

When the coating operation is completed the various energy circuits may be opened, the clevis pin of clevis 44 removed and carriage 12 raised sufficiently to allow truck 42 to be moved away. Truck 42' can then be positioned and the coating operation again begun. During this coating operation coated workpiece 33 can be removed, another substituted and a new mold prepared on truck 42. Thus, at the end of one coating operation a truck is removed and another substituted so that the apparatus carries out its coating metal deposition function with a minimum of interruption and a highly efficient use is made of the apparatus.

Truck 42, as best shown in Figs. 2, 3 and 4 includes a bottom plate 51 which carries channel forming members for the support of wheels 52. One set of wheels 52 have their faces chamfered as shown to ride on the bevelled one of rails 43. A short cylindrical knob 53 extends upwardly from the center of bottom plate 51. A plate 54, provided with a slot into which fits knob 53, rests on bottom plate 51. At each end of truck 42 is provided an arrangement for moving plate 54 relative to bottom plate 51. Each arrangement includes an eye 55, fastened to plate 51 and a bar 56, fastened to plate 54. Bar 56 is reenforced by wing plates or other suitable means. A threaded stud 57 passes through the bar and eye; nuts are threaded on the stud at each side of the bar and the eye. By this arrangement plate 54 may be moved laterally relative to bottom plate 51 or it may be rotated through a considerable angle in either direction relative to bottom plate 51 wtih knob 53 as the center of rotation.

A pair of spaced fulcrum pieces 58 are fastened to the top face of plate 54 adjacent the front edge thereof. On the fulcrum pieces rest grooved plates 59 that are fastened to the bottom of a rectangular frame 60, formed of coped I beams. At the back edge of frame 60 are fastened plates 61 which carry threaded therethrough bolts 62. Bolts 62 bear on plate 54. By means of this arrangement frame 60 may be tilted about fulcrum pieces 58 relative to plates 51 and 54. Support plates 63 are positioned on the longitudinal beams of frame 60 and are attached thereto. On the back plate 63 is a rectangular frame 64 also formed of coped I beams. To the bottom beam of frame 64 is fastened a foot plate; frame 64 is secured to plate 63 through this foot plate.

At each corner of frame 64 is a support plate 65. Plates 65 support forwardly projecting arms 66. These arms are conveniently formed of I beams and are held in position on plates 65 and 63 by bolts 67. Bearing plates 68 are attached to the ends of arms 66 to facilitate the connection. Plates 65, as well as plate 63, are provided with rows of spaced bolt holes so that the longitudinal distance between arms 66 may be adjusted to accommodate workpieces 33 of different widths. The flanges of the I beams beneath the bolt holes in plates 63 and 65 are also provided with spaced bolt holes therein aligned with those in the plates.

As shown, arms 66 are arranged in spaced tiers.

The arms of each tier and the elements carried by them are identical so that the description of one tier will suffice for both. The upper and lower arms 66 are joined by guide members 70 attached thereto. One of these members is vertically disposed while the other is disposed at an angle to the vertical. To the top of the vertical guide member is attached an angle member 71. An angle member 72 is attached to arms 66 in line with member 71. The upper ends of the angle members are connected through a strap piece. Positioning devices 73 are supported from angle member 72.

Each device 73 includes a rod 74 that passes through a hole in a small plate 75 carried by member 72 and ends in a cylindrical head 76 fitted in side pieces 77 carried by angle member 78. A pin carried by head 76 is journalled in side pieces 77 so that movement of rod 74 in either direction moves angle member 78 with it. Angle member 78 is attached to mold member 79. Mold member 79 is shown as a hollow water box having connections, not shown, for circulating water therethrough. Mold member 79 is provided with a recess in which is placed ceramic material 80, preferably in the form of blocks or tiles, so as to present a ceramic surface to the contact of the molten deposited metal and to the edge of the base metal 33 in the zone in which the base metal is fused. By this arrangement the very edge of the base metal may be exposed to the action of electrodes 31' without danger of fusing mold member 79. While this form of mold member 79 is preferred other forms may be used.

A piece 82 is clamped on rod 74 adjacent its other end. A bolt 83 extends loosely through clamp 82, plate 75 and clip 84 attached to the end of plate 75. A set collar is secured on bolt 83 near clamp piece 82 and a nut is threaded on bolt 83 between plate 75 and clip 84. By rotating the head of bolt 83 in one direction, rod 74 moves head 76, as well as mold piece 80, toward the workpiece while when the head of bolt 83 is rotated in the opposite direction the opposite movement of the mold piece is obtained.

On rod 74, between head 76 and plate 75, is a piece 85 through which bolts are threaded. The ends of these bolts bear on a small plate carried by angle member 71. By tightening these bolts the head end of rod 74 is moved away from angle member 71 and pressure is exerted to force mold piece 79 tightly against the contiguous mold forming members.

Mold pieces 79 move on a hollow metal box 86 through which water may be circulated by means of connections not shown. Box 86 is positioned on blocks that rest on plate 63. A metal bar 87 rests on box 86 and forms the bottom of the mold space. The bottom of base metal 33 contacts the top surface of bar 87. It is on this bar that the arc starting steel wool is placed, and it is on this bar that the arcs are initially struck. Mold pieces 79 may abut bar 87 as shown or bar 87 may be lengthened and mold pieces 79 rest on it.

To each of arms 66 is attached, through a suitable small plate, a threaded stud 88. Studs 88 pass through eyes carried by a frame 89. Nuts are provided on each side of the eyes so that frame 89 may be fixed in any desired position along studs 88. Frame 89 supports a metal plate 90, preferably of copper, which can be used directly to form a mold surface or which can serve as a backing for a ceramic material 91, preferably in brick or tile form, when a ceramic lining is desired. When late 90 is used to directly form the mold surface, frame 89 is positioned as required to provide a mold space of desired width, box 86 and bar 87 are then positioned against plate 90. When the mold surface is to be defined by ceramic material 91, frame 89 is moved forward by a distance equal to the thickness of the ceramic material; box 86 is then positioned against plate 90. The ceramic lining is formed by laying the bricks or tiles against plate 90 with box 86 as the bottom support. When this is done bar 87 is positioned, workpiece 33 put in place and the mold completed by moving in mold pieces 79. Any joints through which molten flux or metal may pass are closed from the inside with powdered flux and from the outside with a suitable refractory cement or paste.

Rods 92 are carried at the corners of frame 89. Rods 92 pass through ears at the corners of water box 93 and provide guides for its vertical movement. The face of box 93 opposite plate 90 is perforated so that in operation the water supplied to box 93 will pass through the perforations and impinge on plate 90 to remove heat therefrom. An eye is provided at the top of box 93 for connection to member 94 that is attached to the middle of the bottom cross bar of carriage 12 so that in operation box 93 duplicates the vertical movement of carriage 12 while it reciprocates beneath carriage 12 with truck 42. Member 94 may conveniently be a cable or a rope and provided with a hook at its lower end. Box 93 is shown in an intermediate position such as it would occupy during operation to avoid unnecessary multiplication of the figures of the drawings. The length of member 94 is preferably such that during operation the center of box 93 is maintained somewhat above the discharge ends of the electrodes.

Workpiece 33 is placed and held in mold forming position through yoke 95, shown in detail in Figs. 5, 6 and 7. Yoke 95 includes side members 96 that are bolted to a bottom member 97. One of the bolt connections is preferably left a little loose to allow a limited movement of one of side members 96 about bottom member 97. Side members 96 carry plates 98 attached to their inner sides. Plates 98 include threaded holes through which pass workpiece retaining bolts 99. Bolts 99 preferably have sharp ends so that they can bite into workpiece 33. Guide plates 100 are attached to the outside surfaces of side members 96 and are shaped to fit between guide members 70.

A pair of support plates 101 are bolted in position at the top end of one of side members 96. Plates 101 support pin 102 upon which one end of each of arms 103 is pivoted. Set collars are provided at the ends of pin 102 to keep arms 103 in place. Arms 103 are joined, adjacent pin 102, by a small plate to form a rigid structure. At the other end of arms 103 is journalled a pin 104 on which are pivoted links 105; set collars are provided to keep pin 104 on arms 103. Links 105 are joined by a striking plate 106. Links 105 are also pivoted on pin 107 that is carried by plates 108. These plates are bolted to the top end of the other side member 96. A bracing piece is united to arms 103 adjacent this end. To prevent downward movement of arms 103 below the position shown in solid lines, a generally U-shaped stop piece 109 is attached to them. Piece 109 is located over pin 107 so that it will strike links 105 over their fixed support if for any reason arms 103 tend to move down below the position shown. A small piece 110 is attached to plates 108 and is provided with a threaded hole in which can be screwed safety bolt 111. With bolt 111 in the position shown arms 103 cannot be raised to the dotted line position.

On the bolts that hold plates 101 and 108 are positioned links 112 to which are connected the ends of a chain 113, a cable may be used if preferred. In the middle of chain 113 is a link 114 which is adapted to receive the hook of a crane, or other device, used for moving yoke 95.

To position workpiece 33 in yoke 95 the following procedure may be followed. Workpiece 33 is placed on a flat horizontal surface with the face thereof that is to be coated on the horizontal surface. Yoke 95, after the inside ends of bolts 99 have been retracted until they approach plates 98, arms 103 have been brought to the solid line position and safety bolt 111 secured in place, is placed around workpiece 33 with the edges of guide plates 100, that are to contact the vertical guide edges of guide members 70, facing and parallel to the horizontal surface. The spacing between the horizontal surface and the edges of guide plates 100 just above referred to, is made equal to the distance between the vertical guide edges of members 70 and the face of workpiece 33 required to produce a mold space of desired width. The proper spacing can be easily and accurately obtained by providing a plurality of members of the proper height that project from the horizontal surface and which are positioned to have the edges of plates 100, above referred to, rest upon them. These projecting members may be adjustable in height. The assembly is completed by screwing bolts 99 until they firmly hold workpiece 33 in place. A crane hook may then be placed in link 114 and the whole assembly raised and moved over the truck in its 42' position.

The assembly is then lowered so that guide plates 100 move between guide members 70. When plates 100 reach the lower position their vertical edges will be against the guide edges of vertical members 70 and the face of workpiece 33 will be in the required position.

At the end of the coating operation the truck is again moved to its 42' position and the crane hook again placed in link 114. The bolts carried by piece 85 are loosened and the head of bolt 83 turned to move mold members 79 away from workpiece 33. When members 79 ride on bar 87, members 79 are retracted far enough to clear bar 87. Yoke 95 is then raised; sometimes it will be necessary to jerk it a little to start its initial movement. Usually some or all of bricks, or tiles, 80 move up with workpiece 33 and are carried away with it; the same is true of bricks, or tiles, 91 when they are used. Thus, the use of bricks or tiles rather than solid ceramic linings is advantageous as the upward movement of workpiece 33 is not impeded by them and after each operation the brick or tile lining can be easily repaired or rebuilt.

After removal the assembly is laid on any suitable horizontal surface and after safety bolt 111 is removed plate 106 is struck with a sledge or other bludgeon to move arms 103 to the dotted line position of Fig. 6. In doing this the loosely bolted side 96 moves about its bolt through a distance sufficient to relieve the pressure exerted by bolts 99. These can then easily be loosed to allow removal of yoke 95 from the coated workpiece so that yoke 95 can again be used.

When all of the workpieces 33 to be handled are of substantially the same width, mold spaces of various heights and widths can be produced with a single yoke 95, frame 89 and plate 90. With a single set of these elements some variation in mold space length is also possible. However, when workpieces 33 of a wide range of sizes are to be handled it is best to provide several sets of yokes 95, frames 89 and plates 90. When changing from one set to another arms 66 are adjusted on frame 64 to provide the proper spacing between guide members 70 and between studs 88.

The apparatus has been shown as formed of plate and the usual structural shapes as it can conveniently be made from these materials, however, forgings and castings can be used whenever preferred. Elements of the apparatus have been described as separate from other elements but attached thereto; such elements can be made integral wherever desirable and possible. Welding is the preferred way of attaching the elements of the apparatus, unless some other way has been specifically stated, but any other way of attaching the elements may be employed.

I claim:

1. In apparatus for manufacturing composite metal articles made up of a body of base metal to which is united a depth of coating metal, a mold having a mold space defined at least in part by vertical surface of the body of base metal to be coated, electrode means adapted to produce molten metal in said mold space, means for raising said electrode means as the level of the liquid metal rises in said mold space, said electrode means being less in width than the length of said mold space, means for reciprocating said mold relative to said electrode means, and means for adjusting the length of the reciprocating movement to subject the full length of said mold space to the action of said electrode means.

2. In apparatus for manufacturing composite metal articles made up of a body of base metal to which is united a depth of coating metal, a mold having a mold space defined at least in part by vertical surface of the body of base metal to be coated, electrode means adapted to produce molten metal in said mold space, means for raising said electrode means as the level of the liquid metal rises in said mold space, said electrode means being less in width than the length of said mold space, means for reciprocating said mold relative to said electrode means, means for adjusting the period of said reciprocatory movement, and means for adjusting the length of said reciprocatory movement to subject the full length of said mold space to the action of said electrode means.

3. In apparatus for producing metal, a mold having a mold space therein, electrode means adapted to produce molten metal in said mold space, electric current contact means for said electrode means vertically movable in said mold space, means for reciprocating said mold in a fixed path relative to said contact means, means for adjusting the length of the reciprocatory movement and means for adjusting the position of the middle point of the reciprocatory movement along said fixed path.

4. In apparatus for producing metal, a mold having a mold space therein, means supporting said mold for movement in a fixed path, electrode means adapted to produce molten metal in said mold space, and means for reciprocating said mold support means in said fixed path, said reciprocating means including crank means and means for adjusting the length of stroke of said crank means.

5. In apparatus for producing metal, a mold having a mold space therein, means supporting said mold for movement in a fixed path, electrode means adapted to produce molten metal in said mold space, crank means for reciprocating said mold support means in said fixed path, an elongated member connecting said crank means to said mold support means and means for adjusting the length of said member.

6. In apparatus for producing metal, a mold having a mold space therein, means supporting said mold for movement in a fixed path, electrode means adapted to produce molten metal in said mold space, an elongated member of adjustable length having one end thereof pivotally connected to said mold supporting means, an element having one end thereof pivoted on a fixed pivot, means for pivotally connecting the other end of said elongated member to said element, means for adjusting the position of said pivotally connecting means along the length of said element, and a driven crank member pivotally connected to the other end of said element.

7. In apparatus for producing metal, a mold having a mold space therein and including a substantially vertical external surface, means supporting said mold for movement in a fixed path, electrode means adapted to produce molten metal in said mold space, means for raising the discharge end of said electrode means as the molten metal rises in said mold space, means supported on said mold and movable therewith in said fixed path adapted to direct a heat exchange medium against said external surface of said mold, and means for raising said heat exchange medium directing means with the discharge end of said electrode means to maintain a predetermined positional relation between them.

8. In apparatus for producing metal, a mold support, a mold on said support having a substantially vertical external surface and a mold space, electrode means adapted to produce molten metal in said mold space, means for raising the discharge end of said electrode means as the molten metal rises in said mold space, vertical guide means carried by said mold adjacent the edges of said exposed surface, means adapted to discharge a heat exchange medium against said exposed surface mounted for vertical movement on said guides, and means for raising said heat exchange medium discharge means on said guides with the discharge end of said electrode means to maintain a predetermined positional relation between them.

9. In apparatus for producing metal bodies, a mold support movable in a fixed path, mold means on said support having a mold space therein defined in part by a surface normally substantially vertically disposed, means engaging said mold means and said mold support for adjusting the position of said surface transversely and angularly relative to said path of movement, and further means engaging said mold means and said mold support means for tilting said surface relative to said mold support.

10. In apparatus for producing composite metal articles made up of a body of base metal to which is united a depth of coating metal, a mold support, a mold formed in part by the body of base metal to be coated, said mold including a mold space having a normally substantially vertical surface thereof defined by said body of base metal, electrode means vertically movable in a fixed path adapted to fuse metal of said body of base metal at said surface, and means for tilting said body of base metal relative to said mold support whereby as said surface changes in contour due to expansion during the metal producing operation a constant distance may be maintained between said electrode means and said surface.

11. In apparatus for producing metal bodies, a mold support movable in a fixed path, said mold support including an elongated platform from the center of which projects a guide and pivot element, mold means carried on said platform, said mold means including a base member, said base member having an elongated slot therein normally transverse to said fixed path into which said guide and pivot element is adapted to extend, said mold means also including a mold space having a normally vertically disposed surface thereof defined by the body of base metal to be coated, and means at each end of said elongated platform for moving said base member relative to said platform, each of said moving means including an element attached to said platform, an element attached to said base member and means for adjusting the spacing between said elements whereby said normally vertical surface may be moved transversely relative to said fixed path or rotated about said guide and pivot member.

12. In apparatus for producing metal bodies, a mold support movable in a fixed path, said mold support including an elongated platform, a guide and pivot element projecting upwardly from the center of said platform, mold means carried on said platform including a base member, means at each end of said platform for moving said base member relative to said platform, said moving means each including an element fixed to said platform, an element fixed to said base member and means for adjusting the spacing between said elements, said mold means including a mold space having a normally vertically disposed surface, said surface being defined by a mold element supported on said base member, and means for tilting said mold element relative to said platform.

13. In apparatus for producing metal bodies, a mold support, a vertically extending frame on said support, said frame including a back portion and a pair of spaced side portions, said side portions of said frame being adjustably positioned on said back portion of said frame, a front mold element, a back mold element, said mold elements being supported from said side portions of said frame and being adjustably positionable relative to each other, and movable side mold elements positionable against said front and back mold elements.

14. In apparatus for producing metal bodies, a mold support, a vertically extending frame on said support including a back portion and a pair of spaced side portions, a front mold element, a back mold element, said elements being normally vertically disposed, means for supporting said back mold element from said side portions of said frame, means carried by said side portions of said frame supporting said front mold element, means for adjusting the position of said front mold element on its supporting means, and end mold elements adapted to bear against said front and back mold elements to close the sides of the mold space.

15. In apparatus for producing metal bodies, a mold support, a vertically extending frame on said support including a back portion and a pair of spaced side portions, a front mold element, a back mold element, said elements being normally vertically disposed, means carried by said side portions of said frame supporting said front mold element, means for adjusting the position of said front mold element on its supporting means, removable means supporting said back mold element in mold forming position, guide means on said side portions of said frame and on said removable means positioning and supporting said removable means, and movable end mold elements adapted to be positioned against said front and back mold elements to close the sides of the mold space.

16. In apparatus for producing metal bodies, a mold support, a vertically extending frame on said support including a back portion and a pair of spaced side portions, a front mold element, a back mold element, said elements including mold space defining surfaces normally vertically disposed, means carried by said side portions supporting said front mold element, removable means supporting said back mold element in mold forming position, spaced guide members on each of said side portions including a vertical guideway, a guideway inclined to the vertical and an open top, guide shoes connected to said removable means, said guide shoes being shaped to fit between said guide members whereby said removable means may be lowered into and raised out of mold forming position, and end mold elements adapted to bear against said front and back mold elements to close the sides of the mold space.

17. In apparatus for producing metal bodies, a mold support, a vertically extending frame on said support including a back portion and a pair of spaced side portions, a front mold element, a back mold element, said mold elements being supported from said side portions of said frame and being adjustably positionable relative to each other, movable end mold elements adapted to bear against said front and back mold elements to close the sides of the mold space, means for moving said end mold elements against said front and back mold elements and for applying pressure to said end mold elements to maintain them against said front and back mold elements.

18. In apparatus for producing metal bodies, a mold support, a vertically extending frame on said support including a back portion and a pair of spaced side portions, a front mold element, a back mold element, said mold elements being supported from said side portions of said frame and defining substantially vertical surfaces of the mold space, end mold elements defining substantially vertical mold space end surfaces adapted to bear against said front and back mold elements, means supported by said side portions of said frame for moving said end mold elements' in a line generally normal to their mold space defining surfaces, means for applying pressure on said end mold elements in their line of movement, and means for applying pressure on said end mold elements in the direction of said front mold element.

19. In apparatus for producing metal bodies, a mol support, a vertically extending frame on said support including a back portion and a pair of spaced side portions, a front mold element, a back mold element, said mold elements being supported from said side portions and defining normally parallel substantially vertical surfaces of the mold space, said front mold member and the mold surface defined by it extending laterally beyond said back mold member, end mold elements defining normally substantially vertical mold space end surfaces and adapted to be positioned against said front and back mold elements, elongated members connected to said end mold elements adapted to move said end mold elements in a line generally normal to the mold surfaces defined by them, said elongated members being supported adjacent one end thereof by said side portions, screw means connected to said elongated members and to said side portions for moving said elongated members, and screw means carried by said elongated members and adapted to bear against said side portions for urging said elongated members toward said front mold element.

20. In apparatus for producing metal bodies, a mold support, a vertically extending frame on said support including a back portion and a pair of spaced side portions, a front mold element, a back mold element, said elements being supported from said side portions and being adjustably positionable relative to each other, movable end mold elements adapted to bear against said front and back mold elements to close the sides of the mold space, said end mold elements including vertically extending recesses therein and vertically stacked ceramic blocks in said recesses, said blocks being adapted to contact said front and back mold elements and define the sides of the mold space.

21. In apparatus for producing metal bodies, a mold support, a vertically extending frame on said support including a back portion and a pair of spaced side portions, a front mold element, a back mold element, said elements being supported from said side portions and being adjustably positionable relative to each other, movable end mold elements adapted to bear against said front and back mold elements to close the sides of the mold space, said end mold elements being provided for circulation of a cooling medium therethrough and including vertically extending recesses therein and vertically stacked ceramic blocks in said recesses, said blocks being adapted to contact said front and back mold elements and define the sides of the mold space.

22. In apparatus for producing metal bodies, a mold support, a vertically extending frame on said support including a back portion and a pair of spaced side portions, a front mold element, a back mold element, said elements being supported from said side portions and being adjustably positionable relative to each other, movable end mold elements adapted to bear against said front and back mold elements to close the sides of the mold space, a bottom mold element provided for circulation of a heat exchange medium therethrough, and a bottom member on said bottom mold element positioned to contact said front mold element, said end mold elements and the bottom of said back mold element, said bottom member defining the bottom of said mold space.

23. In apparatus for producing metal bodies, a mold support, a vertically extending frame on said support including a back portion and a pair of spaced side portions, a front mold element, a back mold element, said mold elements being supported from said side portions and being adjustably positioned relative to each other, said mold elements including opposed normally vertical surfaces, movable end mold elements adapted to bear against said front and back mold elements to close the mold space, a mold bottom element, a mold bottom forming member on said bottom element, said mold bottom member being positioned to contact the vertical surface of said front element and the bottom of said back mold element, and ceramic blocks stacked on said mold bottom member and against the vertical surface of said front member to form a ceramic lining for the front surface of the mold space.

24. In apparatus for producing metal bodies, a mold support, a vertically extending frame on said support including a back portion and a pair of spaced side portions, mold front, mold back and mold end elements positioned on said side portions, guideway forming members on said side portions, and a mold back element carrying member positionable between said side portions in said guideways, said carrying member including a generally U-shaped frame, guide members shaped to fit in said guideways carried by the sides of said frame, a plurality of screw means for engaging said back mold element, and releasable means for closing the top of said frame, said frame encircling said mold back element, said mold back element being adjustably positionable in said frame.

25. In apparatus for producing metal bodies, a mold support, a vertically extending frame on said support including a back portion and a pair of spaced side portions, mold front, mold back and end elements positioned on said side portion, guideway forming members on said side portions, and a mold back element carrying member positionable between said side portions in said guideways, said carrying member including a generally U-shaped frame, guide members shaped to fit in said guideways carried by the sides of said frame, a plurality of screw means for engaging said back mold element, releasable means for closing the top of said frame, and means preventing unwanted opening of said releasable means, said frame encircling said back mold element, said back mold element being adjustably positioned in said frame.

26. In apparatus for producing metal bodies, a mold support, a vertically extending frame on said support including a back portion and a pair of spaced side portions, mold front, mold back and end elements positioned on said side portion, guideway forming members on said side portions, and a mold back element carrying member positionable between said side portions in said guideways, said carrying member including a generally U-shaped frame, guide members shaped to fit in said guideways carried by the sides of said frame, an arm member pivoted to the end of one side of said frame and extending over the other side of said frame, a link member having one end pivoted to said arm member, said link member being also pivoted to the end of said other side, and stop means preventing movement of the arm member and link member out of closed position, one of said sides being capable of sufficient movement to allow movement of the arm member and link member out of closed position, and screw means carried by said frame for engaging said back mold element.

ROBERT K. HOPKINS.